United States Patent [19]

Ishihara et al.

[11] Patent Number: 4,997,898
[45] Date of Patent: Mar. 5, 1991

[54] VINYLCYCLOHEXANE-BASED POLYMERS AND PROCESS FOR PRODUCTION THEREOF

[75] Inventors: Nobuhide Ishihara, Oxford, United Kingdom; Masahiko Kuramoto, Ichihara, Japan

[73] Assignee: Idemitsu Kosan Co., Ltd., Tokyo, Japan

[21] Appl. No.: 281,470

[22] Filed: Dec. 8, 1988

[30] Foreign Application Priority Data

Dec. 29, 1987 [JP] Japan .................................. 62-335893

[51] Int. Cl.$^5$ ............................................... C07C 2/26
[52] U.S. Cl. ...................................... 526/308; 585/12; 585/17; 585/20
[58] Field of Search ............................ 585/12, 17, 20; 526/308

[56] References Cited

U.S. PATENT DOCUMENTS

| | | | |
|---|---|---|---|
| 4,226,965 | 10/1980 | Grigoriev et al. | 526/308 |
| 4,663,394 | 5/1987 | Kakugo et al. | 526/308 |

FOREIGN PATENT DOCUMENTS

| | | | |
|---|---|---|---|
| 0210615 | 2/1987 | European Pat. Off. | |
| 1312895 | 1/1962 | France | 526/308 |
| 5159989 | 11/1974 | Japan | 526/308 |
| 62-104818 | 5/1987 | Japan | |

OTHER PUBLICATIONS

Journal of Polymer Science, Polymer Letters Edition, vol. 7, No. 6, Jun. 1969, New York, U.S.A., pp. 427–435; A. Abe; A. Abe: "Structure and Properties of Poly(Vinylcyclohexane)", * p. 427, lines 6–10 *.

Primary Examiner—Asok Pal

Attorney, Agent, or Firm—Frishauf, Holtz, Goodman & Woodward

[57] ABSTRACT

A novel crystalline vinylcyclohexane-based polymer having a repeating unit represented by the general formula:

(wherein all the symbols are as defined in the appended claims), a degree of polymerization of at least 5 and mainly syndiotactic configuration. This polymer is produced by hydrogenating a styrene-based polymer having a repeating unit represented by the general formula:

(wherein all the symbols are as defined in the appended claims), a degree of polymerization of at least 5 and mainly syndiotactic configuration.

10 Claims, 6 Drawing Sheets

VINYLCYCLOHEXANE-BASED POLYMERS AND PROCESS FOR PRODUCTION THEREOF

BACKGROUND OF THE INVENTION

1. Field of the Invention

The present invention relates to vinylcyclohexane-based polymers and a process for production thereof. More particularly, it is concerned with novel crystalline vinylcyclohexane-based polymers having mainly syndiotactic configuration, and a process for efficiently producing the vinylcyclohexane-based polymers.

2. Description of the Related Art

Amorphous polymers having atactic configuration and crystalline polymers having isotactic configuration are known as vinylcyclohexane-based polymers. Vinylcyclohexane-based polymers with isotactic configuration have a high melting point and are excellent in heat resistance, which can be prepared by polymerizing vinylcyclohexane in the presence of a Ziegler-Natta catalyst (J. Polym. Sci., A2, 5029 (1964)).

Vinylcyclohexane to be used as starting monomer, however, is expensive and is not easily available, which is a big problem in industrial production of vinylcyclohexanebased polymers.

SUMMARY OF THE INVENTION

An object of the present invention is to provide a novel vinylcyclohexane-based polymer.

Another object of the present invention is to provide a crystalline vinylcyclohexane-based polymer having syndiotactic configuration.

Still another object of the present invention is to provide a process for efficiently producing the above crystalline vinylcyclohexane-based polymer having syndiotactic configuration.

It has now been found that hydrogenation of styrene-based polymers having syndiotactic configuration as developed by the present inventors' group (see Japanese Patent Application Laid-Open No. 104818/1987) results in hydrogenation of the benzene nucleus while maintaining the syndiotactic configuration, whereby vinylcyclohexane-based polymers having the syndiotactic configuration which are excellent in heat resistance can be obtained.

The present invention relates to a vinylcyclohexanebased polymer having a repeating unit represented by the general formula(I):

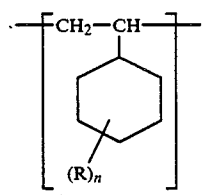

(I)

(wherein R is a hydrogen atom or an alkyl group having 1 to 6 carbon atoms, n is an integer of 1 to 5, and when n is not less than 2, Rs may be identical or different), and a degree of polymerization of at least 5, and further having mainly syndiotactic configuration.

The present invention further provides a process for producing the above vinylcyclohexane-based polymer having mainly syndiotactic configuration which comprises hydrogenating a styrene-based polymer having a repeating unit represented by the general formula (II):

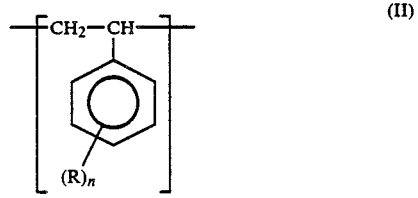

(II)

(wherein R and n are the same as above) and a degree of polymerization of at least 5, and further having mainly syndiotactic configuration.

DESCRIPTION OF PREFERRED EMBODIMENTS

Figure 1:
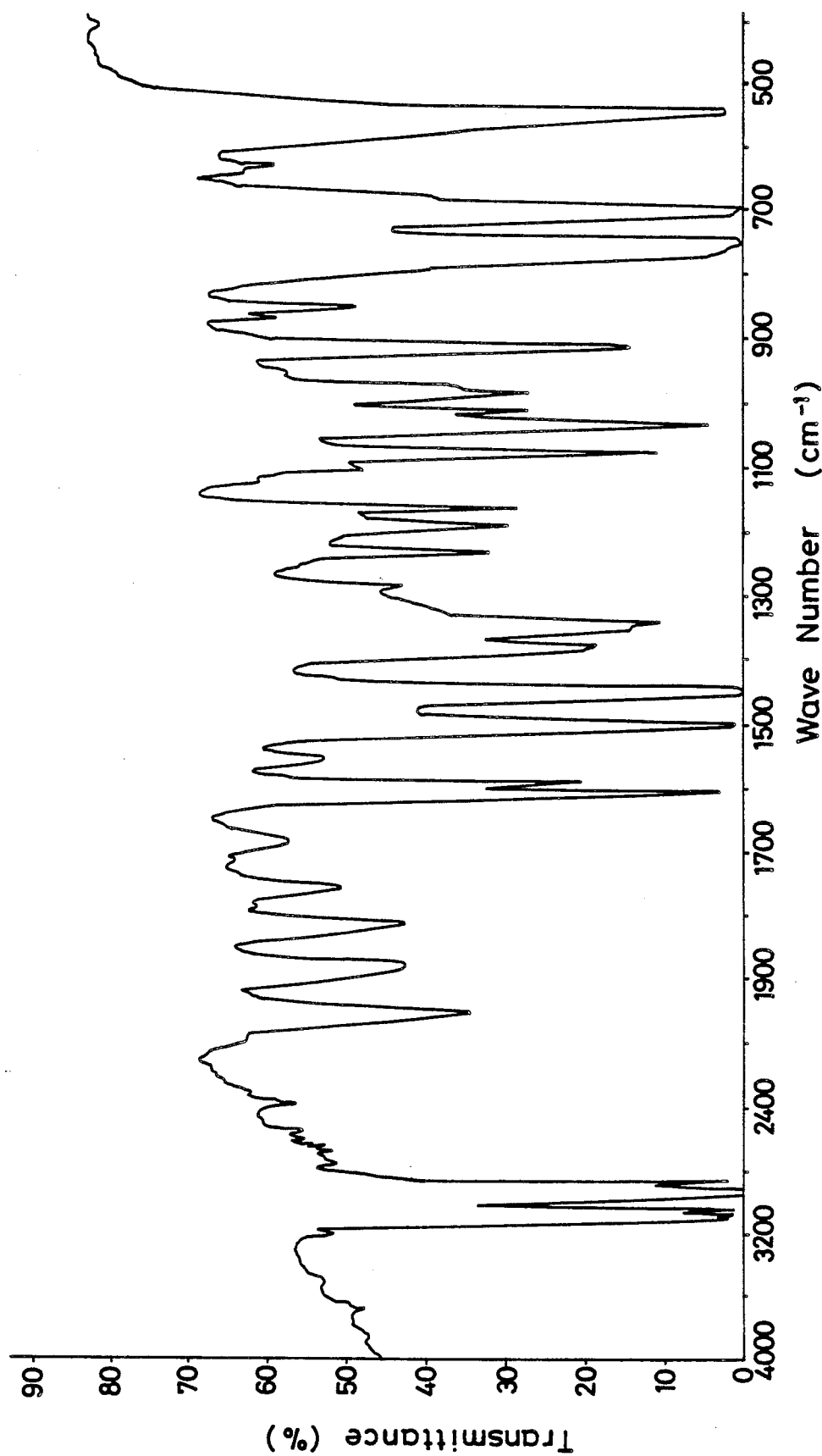
FIG. 1 is an infrared absorption spectrum of the polymer obtained in Example 1 (2)

The vinylcyclohexane-based polymer of the present invention has, as described above, a repeating unit represented by the general formula (I). In the general formula (I), R is a hydrogen atom or an alkyl group having 1 to 6 carbon atoms.

Specific examples of the repeating unit (I) are a vinylcyclohexane unit, a 1-vinyl-2-methylcyclohexane unit, a 1-vinyl-3-methylcyclohexane unit, a 1-vinyl-4-methylcyclohexane unit, a 1-vinyl-2,4-dimethylcyclohexane unit, a 1-vinyl-2,5-dimethylcyclohexane unit, a 1-vinyl-3,4-dimethylcyclohexane unit, a 1-vinyl-3,4,5-trimethylcyclohexane unit, a 1-vinyl-2-ethylcyclohexane unit, a 1-vinyl-3-ethylcyclohexane unit, a 1-vinyl-4-ethylcyclohexane unit, a 1-vinyl-4-tert-butylcyclohexane unit, and mixtures thereof.

The vinylcyclohexane-based polymer of the present invention has a degree of polymerization of at least 5, preferably 10 to 40,000 and more preferably 15 to 8,000 (a number average molecular weight of at least 550, preferably 1,100 to 400,000 and more preferably 1,650 to 880,000), and a stereoregularity that is mainly syndiotactic; i.e., a stereostructure in which cyclohexane or substituted cyclohexane rings as side chains are located alternately in the opposite directions relative to the polymer chain comprising carbon-carbon bonds. The syndiotacticity is quantitatively measured by the nuclear magnetic resonance (NMR) method. The tacticity measured by the NMR method is indicated in the proportions of a plurality of continuous repeating units, for example, diad in which two repeating units are linked together, triad in which three repeating units are linked together, and pentad in which five repeating units are linked together. The vinylcyclohexane-based polymer of the present invention generally has such a syndiotactic configuration that the proportion of diad (racemidiad) is at least 75% and preferably at least 85%, or the proportion of pentad (racemipentad) is at least 30% and preferably at least 50%. The degree of syndiotacticity, however, somewhat varies with the type of the substituent and so forth.

The vinylcyclohexane-based polymer of the present invention is a novel polymer having a specific stereostructure that has not been discovered. This polymer can be efficiently produced by the process of the present invention.

The process of the present invention uses, as the starting material, a styrene-based polymer having a repeating unit represented by the general formula (II), a degree of polymerization of at least 5, preferably 10 to 40,000 and more preferably 15 to 8,000 (a number average molecular weight of 520, preferably 1,040 to 4,160,000 and more preferably 1,560 to 832,000), and such a stereostructure that is mainly syndiotactic. The syndiotacticity of the styrene-based polymer varies with the syndiotacticity of the vinylcyclohexane-based polymer to be produced, and preferably has such a syndiotactic configuration that is at least 75%, preferably at least 85% in terms of diad, or is at least 35%, preferably at least 50% in terms of pentad.

The styrene-based polymer having syndiotactic configurations can be prepared by polymerizing the corresponding styrene-based monomer as a starting monomer in the presence of a catalyst containing (A) a titanium compound and (B) aluminoxane as main components. Various titanium compounds can be used as the component (A). Preferably at least one compound selected from the group consisting of titanium compounds and titanium chelate compounds represented by the general formula (III) or (IV) is used:

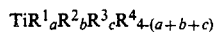  (III)

  (IV)

wherein $R^1$, $R^2$, $R^3$ and $R^4$ are each a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group, or a halogen atom, a, b and c are each an integer of 0 to 4, and d and e are each an integer of 0 to 3.

$R^1$, $R^2$, $R^3$ and $R^4$ of the general formulae (III) and (IV) are each a hydrogen atom, an alkyl group having 1 to 20 carbon atoms (specifically, a methyl group, an ethyl group, a propyl group, a butyl group, an amyl group, an isoamyl group, an isobutyl group, an octyl group, and a 2-ethylhexyl group), an alkoxy group having 1 to 20 carbon atoms (specifically, a methoxy group, an ethoxy group, a propoxy group, a butoxy group, an amyloxy group, a hexyloxy group, a 2-ethylhexyloxy group, and the like), an aryl group having 6 to 20 carbon atoms, an alkylaryl group, an arylalkyl group (specifically, a phenyl group, a tolyl group, a xylyl group, a benzyl group, and the like), an acyloxy group having 1 to 20 carbon atoms (specifically, a heptadecylcarbonyloxy group, and the like), a cyclopentadienyl group, a substituted cyclopentadienyl group (specifically, a methylcyclopentadienyl group, a 1,2-dimethylcyclopentadienyl group, a pentadimethylcyclopentadienyl group, and the like), an indenyl group, or a halogen atom, (e.g., chlorine, bromine, iodine, or fluorine). $R^1$, $R^2$ and $R^3$ may be the same or different.

a, b and c are each an integer of 0 to 4, and d and e are each an integer of 0 to 3.

Specific examples of the tetravalent titanium compound and titanium chelate compound represented by the general formula (III) are methyltitanium trichloride, titanium tetramethoxide, titanium tetraethoxide, titanium monoisopropoxy trichloride, titanium diisopropoxy dichloride, titanium triisopropoxy monochloride, tetra(2-ethylhexyloxy)titanium, cyclopentadienyltitanium trichloride, biscyclopentadienyltitanium dichloride, cyclopentadienyltitanium trimethoxide, cyclopentadienyl trimethyltitanium, pentamethylcyclopentadienyltitanium trimethoxide, pentamethylcyclopentadienyl trimethyltitanium, titanium tetrachloride, titanium tetrabromide, bis(2,4-pentanedionate) titanium oxide, bis(2,4-pentanedionate)titanium dichloride, and bis(2,4-pentanedionate)titanium dibutoxide.

As the component (A), in addition to the above compounds, a condensed titanium compound represented by the general formula (V):

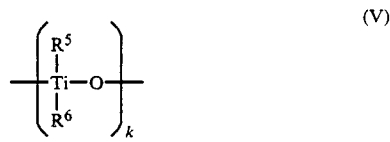  (V)

(wherein $R^5$ and $R^6$ are each a halogen atom, an alkoxy group having 1 to 20 carbon atoms, or an acyloxy group having 1 to 20 carbon atoms, and k is 2 to 20) may be used.

The above titanium compound may be used in the form of complexes with esters, ethers and the like.

Typical examples of the trivalent titanium compound represented by the general formula (IV) to be used as the component (A) are titanium trihalide such as titanium trichloride and cyclopentadienyl titanium compounds such as cyclopentadienyltitanium dichloride. In addition, compounds resulting from reduction of tetravalent titanium compounds can be used. These trivalent titanium compounds may be used in the form of complexes with esters, ethers and the like.

Aluminoxane is used as the component (B) in combination with the component (A). More specifically, alkylaluminoxane represented by the general formula (VI):

  (VI)

(wherein $R^7$ is an alkyl group having 1 to 8 carbon atoms, and p is 2 to 50) can be used. This aluminoxane can be prepared by various methods, e.g., (1) a method in which alkylaluminum is dissolved in an organic solvent and then contacted with water; (2) a method in which alkylaluminum is first added at the time of polymerization, and then water is added; and (3) a method in which alkylaluminum is reacted with water of crystallization as contained in metal salts and the like, or water absorbed on inorganic or organic compounds. The above water may contain ammonia, amine such as ethylamine, sulfur compounds such as hydrogen sulfide, phosphorous compounds such as phosphorous ester, and so on in the proportion of less than 20%.

The catalyst to be used in production of the styrene-based polymer having syndiotactic configuration contains the above components (A) and (B) as main components. If necessary, the catalyst may further contain other catalyst components, e.g., trialkylaluminum represented by the general formula:

$$AlR^8{}_3$$

(wherein $R^8$ is an alkyl group having 1 to 8 carbon atoms) and other organometallic compounds. Although the ratio of the component (A) to the component (B) in the catalyst varies with various conditions and cannot be determined unconditionally, the ratio of aluminum in the component (B) to titanium in the component (A), i.e., aluminum/titanium (by mol) is 1:1 to $1 \times 10^6$:1 and preferably 10:1 to $1 \times 10^4$:1.

The styrene-based polymer is prepared by polymerizing the styrene-based monomer in the presence of the catalyst containing the components (A) and (B) as main components. This polymerization may be bulk polymerization or may be carried out in a solvent, e.g., aliphatic hydrocarbon such as pentane, hexane and heptane, alicyclic hydrocarbon such as cyclohexane, or aromatic hydrocarbon such as benzene, toluene and xylene. The polymerization temperature is not critical, and it is usually 0 to 90° C. and preferably 20 to 70° C.

The molecular weight of the styrene-based polymer can be effectively controlled by polymerizing in the presence of hydrogen.

The styrene-based polymer thus obtained is of high syndiotacticity. However, if de-ashing treatment is applied using a washing solution containing hydrochloride acid, for example, after polymerization, rinsing is applied using a solvent such as methyl ethyl ketone after washing and drying under reduced pressure to remove a soluble content, and further the resulting insoluble portion is treated with chloroform, for example; there can be obtained a high purity styrene-based polymer having a high syndiotacticity.

In accordance with the process of the present invention, the styrene-based polymer having mainly syndiotactic configuration is hydrogenated to produce the desired vinylcyclohexane-based polymer. This hydrogenation results in hydrogenation of the benzene ring while maintaining the syndiotactic configuration of the styrene-based polymer and thus the vinylcyclohexane-based polymer can be obtained.

Hydrogenation of the styrene-based polymer can be carried out under various conditions. Usually it is carried out in the presence of a hydrogenation catalyst, e.g., transition metal salts-alkylalumium catalysts (specifically, nickel (II)-2-ethylhexanate-triethylaluminum), ruthenium-carbon, palladium-carbon, nickel-diatomaceous earth, and nickel-alumina catalyst in a solvent, e.g., alicyclic hydrocarbon such as cyclohexane and dekalin, aliphatic hydrocarbon such as hexane, heptane, octane, and decane, or aromatic hydrocarbon such as benzene, toluene, and xylene under a hydrogen pressure of 50 to 200 kg/cm² at a temperature of 100 to 300° C. for 10 minutes to 10 hours. The aromatic hydrocarbon such as xylene itself is hydrogenated although it acts as a solvent and, therefore, alicyclic hydrocarbon such as decalin is preferably used as the solvent in that it has a high solubility of the starting polymer and it is not hydrogenated.

In accordance with the process of the present invention, the syndiotactic vinylcyclohexane-based polymer having the repeating unit of the general formula (I) can be obtained.

The vinylcyclohexane-based polymer of the present invention is a novel crystalline resin having syndiotactic configuration which is excellent in heat resistance and chemical resistance. Thus it is expected to be widely used as a material for moldings in applications where heat resistance and chemical resistance are required. In accordance with the process of the present invention, the above vinylcyclohexane-based polymer having a desired molecular weight can be efficiently produced, and thus the process is of high industrial value.

The present invention is described in greater detail with reference to the following examples.

EXAMPLE 1

(1) Preparation of Methylaluminoxane 200 ml of toluene was placed in a reactor, and then 47.4 ml (492 mmol) of trimethylaluminum and 35.5 g (142 mmol) of copper sulfate pentahydrate ($CuSO_4 \cdot 5H_2O$) were added and then reacted in a stream of argon at 20° C. for 24 hours.

The copper sulfate was filtered off from the reaction mixture and the toluene was distilled away to obtain 12.4 g of methylaluminoxane. The molecular weight of the methylaluminoxane as determined by the benzene freezing point depression method was 721.

(2) Production of Syndiotactic Polystyrene 100 ml of dry toluene and 30 mmol as aluminum atom of the methylaluminoxane as obtained in (1) above were placed in a 500-milliliter volume glass vessel equipped with a stirrer under an atmosphere of argon, and then 0.05 mmol of cyclopentadienyltitanium trichloride was added thereto.

Subsequently, 25 ml of styrene was introduced and polymerized for one hour at 50° C. At the end of the time, methanol was injected to terminate the reaction. A mixture of hydrochloric acid and methanol was added to decompose the catalyst components (methylaluminoxane and cyclopentadienyltitanium trichloride). The residue was washed with methanol and then dried to obtain polystyrene. The yield was 20.0 g. The weight average molecular weight of the polystyrene was 72,000, and the number average molecular weight of the polystyrene was 40,000. The polystyrene was extracted with methyl ethyl ketone as an extraction solvent in a Soxhlet extraction apparatus for 4 hours, and the insoluble content of the polystyrene was 98% by weight. The melting point of the methyl ethyl ketone-insoluble polystyrene was 266° C. A $^{13}$C-NMR analysis confirmed that the polystyrene was syndiotactic polystyrene (syndiotacticity in racemi pentad: 98%).

(3) Production of Syndiotactic Polyvinylcyclohexane

In a 1-liter volume autoclave were placed 5 g of the syndiotactic polystyrene obtained in (2) above and 150 ml of decalin, and after addition of 10 g of ruthenium-carbon, hydrogenation was carried out for 4 hours at a temperature of 150° C. under a hydrogen pressure of 100 kg/cm².

After the hydrogenation reaction, the ruthenium-carbon was separated and removed, and after the solvent was distilled away, the residue was washed with hexane.

The reaction product thus obtained was crystalline and had a melting point of 351° C. which was much higher than that of the syndiotactic polystyrene as the starting material.

Figure 2:
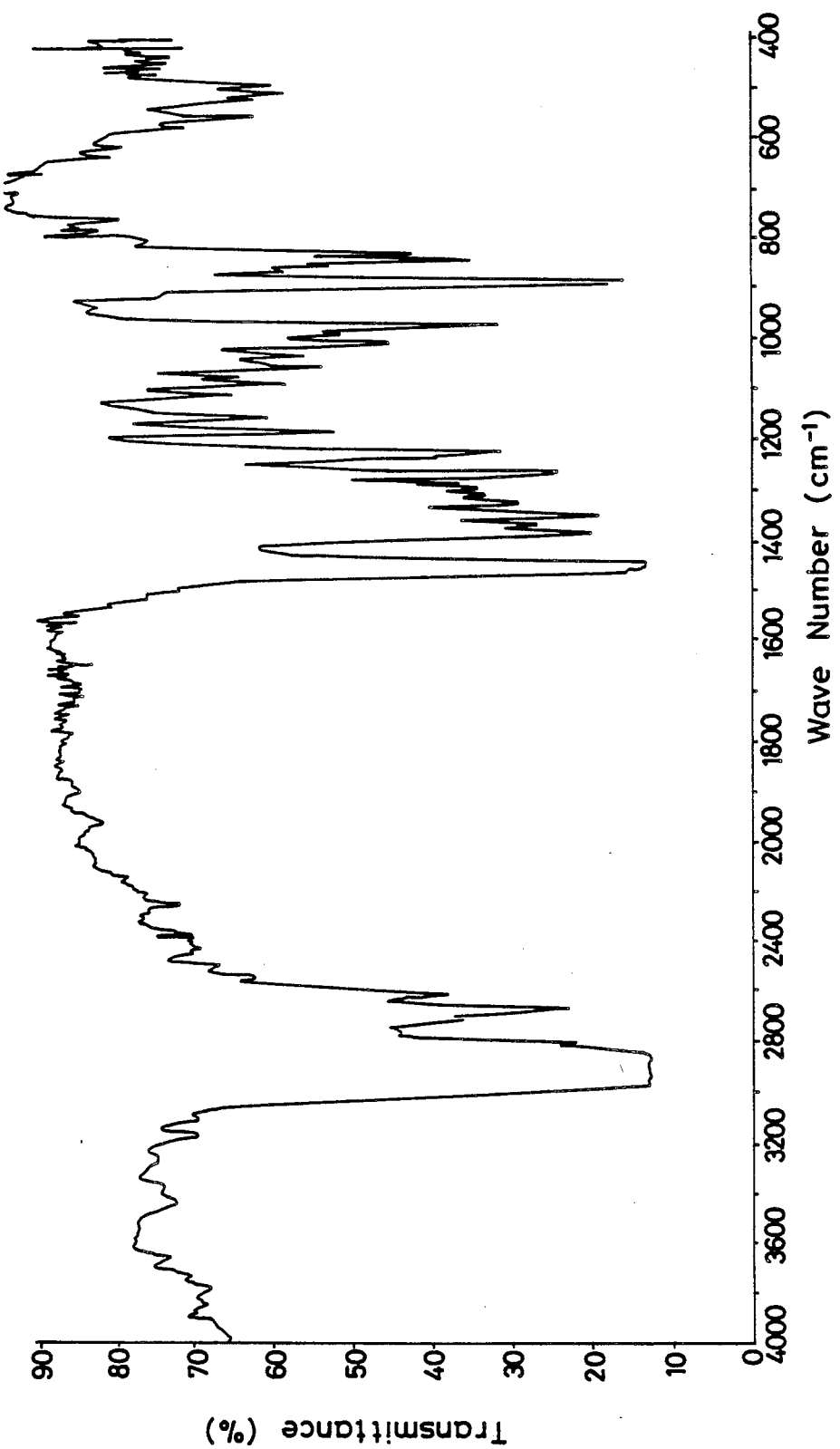
FIG. 2 is an infrared absorption spectrum of the polymer obtained in Example 1 (3)

Infrared absorption spectra (IR) of the polymers obtained in (2) and (3) above are shown in FIGS. 1 and 2, respectively. In the reaction product, an absorption in the vicinity of 1600 cm$^{-1}$ as assigned to the aromatic ring (benzene ring) in the syndiotactic polystyrene of (2) disappeared, which confirmed that the aromatic ring was completely hydrogenated. Thus it was confirmed that the above reaction product was syndiotactic polyvinylcyclohexane.

EXAMPLE 2

(1) Production of Syndiotactic Polystyrene

Polystyrene was produced in the same manner as in Example 1 (2) except that 15 mmol as aluminum atom of methylaluminoxane and 15 mmol of triisobutylaluminum were used in place of 30 mmol as aluminum atom of methylaluminoxane, the amount of styrene was changed to 90 g, and the polymerization was carried out at 60° C for 2 hours. As a result, syndiotactic polystyrene (syndiotacticity in racemi pentad: 92%) having a weight average molecular weight of 9,380, a number average molecular weight of 4,680 and a melting point of 248° C was obtained in a yield of 14.7 g.

(2) Production of Syndiotactic Polyvinylcyclohexane

Hydrogenation was carried out in the same manner as in Example 1 (3) except that as the syndiotactic polystyrene obtained in Example 2 (1) was used. As a result, syndiotactic polyvinylcyclohexane having a weight average molecular weight of 4,900, a number average molecular weight of 2,160 and a melting point of 303° C was obtained in a yield of 4.2 g.

Figure 3:
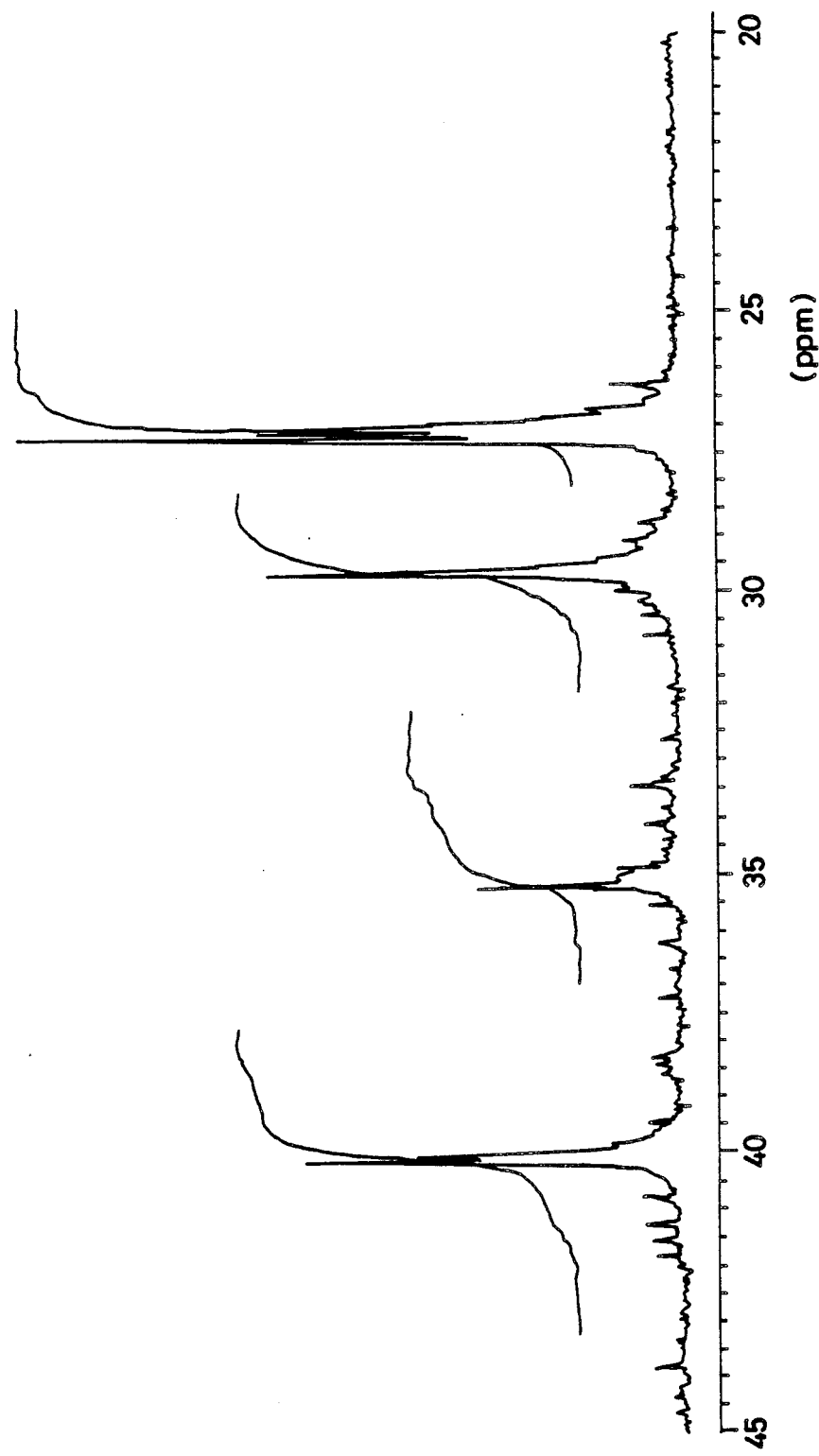
FIG. 3 is a $^{13}$C-NMR spectrum of the polymer obtained in Example 2 (2)

A $^{13}$C-NMR spectrum (solvent: 1,2,4-trichlorobenzene/heavy benzene; measured at 130° C.) of the above syndiotactic polyvinylcyclohexane is shown in FIG. 3.

COMPARATIVE EXAMPLE 1

Figure 4:
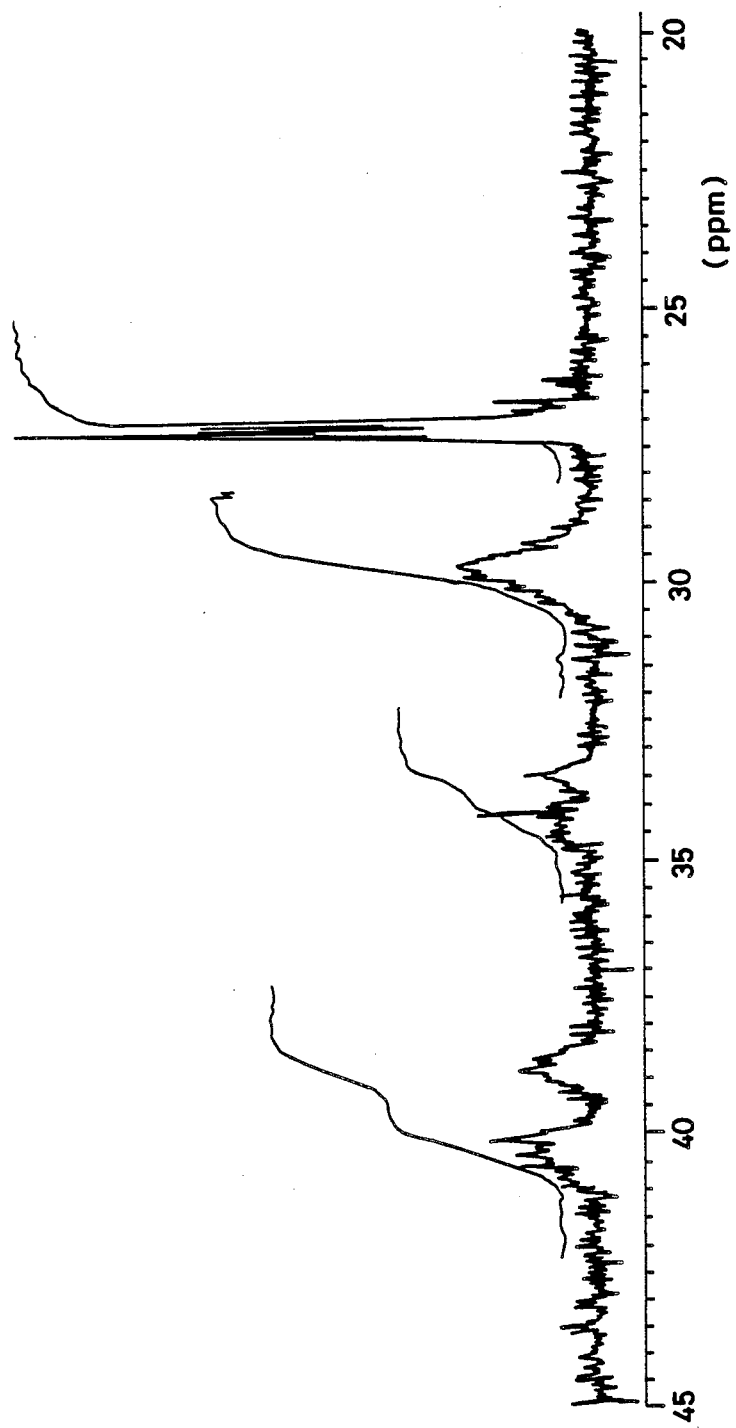
FIGS. 4 to 6 are $^{13}$C-NMR spectrum of the polymers obtained in Comparative Examples 1 to 3, respectively.

Commercially available atactic polystyrene (Idemitsu Styrol HF-10, produced by Idemitsu Petrochemical Co., Ltd.) was hydrogenated in the same manner as in Example 1 (3) to obtain atactic polyvinylcyclohexane. A $^{13}$C-NMR spectrum of the atactic polyvinylcyclohexane is shown in FIG. 4.

COMPARATIVE EXAMPLE 2

Isotactic polystyrene produced by the use of a ZieglerNatta catalyst (TiCl$_3$-Al(C$_2$H$_5$)$_2$Cl) was hydrogenated in the same manner as in Example 1 (3) to obtain isotactic polyvinylcyclohexane. A $^{13}$C-NMR spectrum of the isotactic polyvinylcyclohexane is shown in FIG. 5.

COMPARATIVE EXAMPLE 3

Vinylcyclohexane was polymerized at 60° C. for 2 hours by the use of a Ziegler-Natta catalyst (TiCl$_3$-Al(i-Bu)$_3$) to produce isotactic polyvinylcyclohexane. A $^{13}$C-NMR spectrum of the isotactic polyvinylcyclohexane is shown in FIG. 6.

Figure 5:
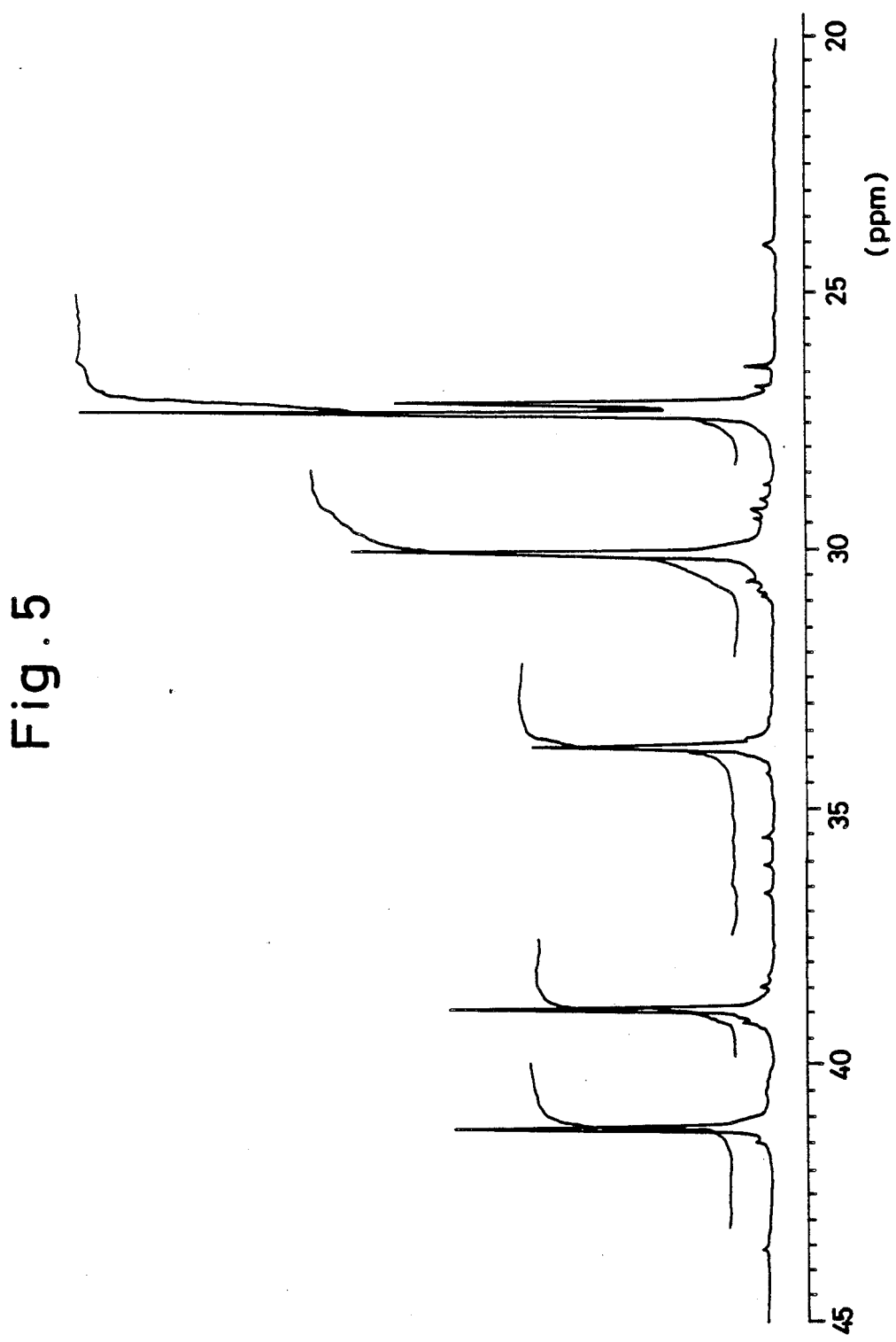
Figure 6:
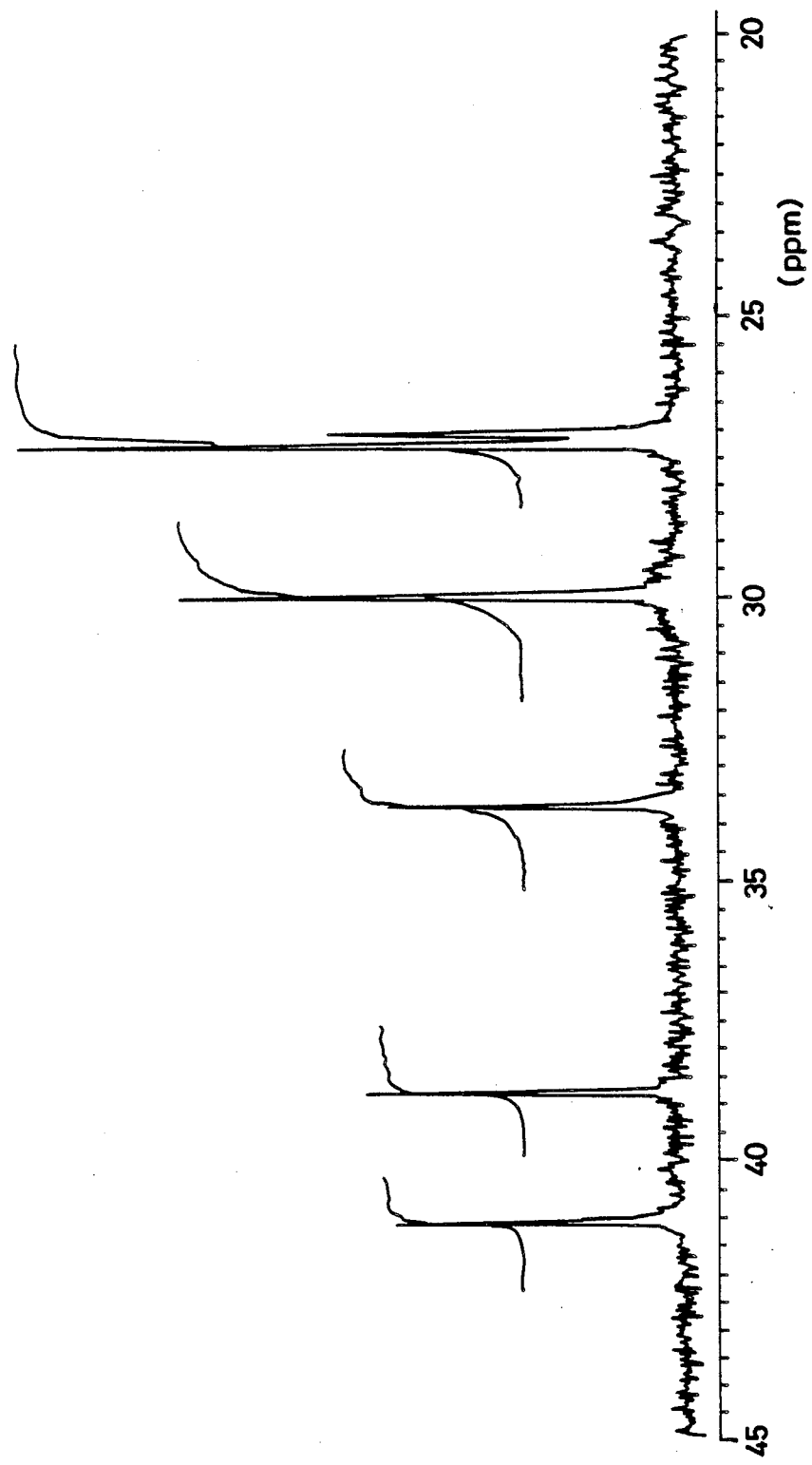

By comparison of FIGS. 3 to 6, it can be seen that the polymer of FIG. 3 (polymer obtained in Example 2 (2)) is distinctly different from those of FIGS. 4 to 6. A signal assigned to the methylene group was observed in the 25 to 36 ppm range, and a signal assigned to the methine group, in the 38 to 42 ppm range. Assignment of the peaks to the methine and methylene groups was confirmed by the DEPT method (135° C., using pulse).

In the polymer obtained in Example 1 (3) and the isotactic polyvinylcyclohexane, the peak of the main chain considered to reflect the conformation is sharp and is of high regularity as compared with that of the atactic polymer.

The methine group is completely distinguishable in the isotactic polyvinylcyclohexane, while on the other hand in the polymer obtained in Example 1 (3), both the methine groups in the main chain and the side chain are in the nearly same magnetic field circumstance.

The polymer of the FIG. 4 is atactic polyvinylcyclohexane. The polymers of FIGS. 5 and 6 are isotactic polyvinylcyclohexanes (FIGS. 5 and 6 are in agreement with each other). The polymer of FIG. 3 has a high melting point and is crystalline.

Based on the above data, it is confirmed that the polymer of FIG. 3, i.e., the polymer obtained in Example 2 (2) is novel syndiotactic polyvinylcyclohexane.

What is claimed:

1. A vinylcyclohexane-based polymer having a repeating unit represented by the general formula:

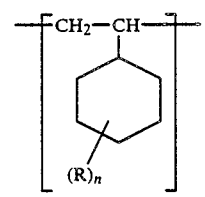

(wherein R is a hydrogen atom or an alkyl group having 1 to 6 carbon atoms, n is an integer of 1 to 5, and when n is not less than 2, Rs may be identical or different, a degree of polymerization of at least 5, and mainly syndiotactic configuration.

2. The vinylcyclohexane-based polymer as claimed in claim 1, wherein the repeating unit is at least one member selected from the group consisting of a vinylcyclohexane unit, a 1-vinyl-2-methylcyclohexane unit, a 1-vinyl-3-methylcyclohexane unit, a 1-vinyl-4-methylcyclohexane unit, a 1-vinyl-2,4-dimethylcyclohexane unit, a 1-vinyl-2,5dimethylcyclohexane unit, a 1-vinyl-3,4-dimethyl-cyclohexane unit, a 1-vinyl-3,4,5-trimethylcyclohexane unit, a 1-vinyl-2-ethylcyclohexane unit, a 1-vinyl-3-ethylcyclo-hexane unit, a 1-vinyl-4-ethylcyclohexane unit and a 1-vinyl-4-tertbutylcyclohexane unit.

3. The vinylcyclohexane-based polymer as claimed in claim 1, wherein the repeating unit is a vinylcyclohexane unit.

4. The vinylcyclohexane-based polymer as claimed in claim 1, which has syndiotactic configuration of at least 35% in terms of pentad.

5. The vinylcyclohexane-based polymer as claimed in claim 1, which has syndiotactic configuration of at least 50% in terms of pentad.

6. The vinylcyclohexane-based polymer as claimed in claim 1, which has a degree of polymerization of 10 to 40,000.

7. The vinylcyclohexane-based polymer as claimed in claim 1, which has a degree of polymerization of 15 to 8,000.

8. The vinylcyclohexane-based polymer as claimed in claim 1, which has syndiotactic configuration of at least 30% in terms of pentad.

9. The vinylcyclohexane-based polymer as claimed in claim 2, which has syndiotactic configuration of at least 50% in terms of pentad; and which has a degree of polymerization of 15 to 8,000.

10. The vinylcyclohexane-based polymer as claimed in claim 3, which has syndiotactic configuration of at least 50% in terms of pentad; and which has a degree of polymerization of 15 to 8,000.

* * * * *